United States Patent
Lu et al.

(10) Patent No.: US 12,313,557 B2
(45) Date of Patent: May 27, 2025

(54) FORMALDEHYDE DETECTING DEVICE

(71) Applicant: National Taiwan Normal University, Taipei (TW)

(72) Inventors: Chia-Jung Lu, Taipei (TW); Rih-Sheng Jian, New Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 839 days.

(21) Appl. No.: 17/546,840

(22) Filed: Dec. 9, 2021

(65) Prior Publication Data

US 2023/0052251 A1    Feb. 16, 2023

(30) Foreign Application Priority Data

Aug. 16, 2021    (TW) ................... 110130092

(51) Int. Cl.
*G01N 21/78*    (2006.01)

(52) U.S. Cl.
CPC .................................... *G01N 21/78* (2013.01)

(58) Field of Classification Search
CPC ........... G01N 21/78; G01N 2021/7796; G01N 31/224

See application file for complete search history.

(56) References Cited

U.S. PATENT DOCUMENTS

2006/0018793 A1* 1/2006 Hashiba ................. G01N 31/22
422/86

FOREIGN PATENT DOCUMENTS

CN    102353673 A  *  2/2012
JP    2002122582 A  *  4/2002

OTHER PUBLICATIONS

Espacenet English Translation of CN102353673A. (Year: 2012).*
Espacenet English Translation of JP2002122582A. (Year: 2002).*

* cited by examiner

*Primary Examiner* — Kathryn Elizabeth Limbaugh
(74) *Attorney, Agent, or Firm* — Birch, Stewart, Kolasch & Birch, LLP

(57) ABSTRACT

A formaldehyde detecting device includes a formaldehyde detecting unit which includes a formaldehyde detecting layer, a diffusion restricting member and a concentration indicator. The formaldehyde detecting layer includes a formaldehyde detecting material that develops color when reacting with formaldehyde. The diffusion restricting member is disposed on the formaldehyde detecting layer and permits a restricted amount of formaldehyde to pass therethrough to react with the formaldehyde detecting material. Concentration of formaldehyde is determined based on a color change on the formaldehyde detecting layer, and is indicated by the concentration indicator.

11 Claims, 3 Drawing Sheets

FORMALDEHYDE DETECTING DEVICE

CROSS-REFERENCE TO RELATED APPLICATION

This application claims priority of Taiwanese Invention Patent Application No. 110130092, filed on Aug. 16, 2021.

FIELD

The disclosure relates to a detecting device, and more particularly to a formaldehyde detecting device.

BACKGROUND

Chinese Invention Patent Application Publication No. CN 102353673 A discloses a formaldehyde detecting paper that is prepared by immersing a paper into a color developing agent. The color developing agent is composed of ammonium acetate, glacial acetic acid, acetylacetone and distilled water. When the formaldehyde detecting paper is in contact with formaldehyde, formaldehyde reacts with acetylacetone in the presence of ammonium acetate to give a yellow compound, which induces a color change of the formaldehyde detecting paper. By comparing the color change of the formaldehyde detecting paper to a colorimetric chart, concentration of the formaldehyde could be therefore determined.

Although the abovementioned formaldehyde detecting paper is capable of detecting the presence of formaldehyde, a color chart is still required to determine concentration of formaldehyde detected, which is inconvenient to use.

SUMMARY

Therefore, an object of the disclosure is to provide a formaldehyde detecting device that can alleviate at least one of the drawbacks of the prior art.

According to the disclosure, the formaldehyde detecting device of this disclosure includes a formaldehyde detecting unit and a formaldehyde barrier unit. The formaldehyde detecting unit has a first surface through which formaldehyde enters, a second surface opposite to the first surface, and a lateral surface interconnecting the first surface and the second surface. The formaldehyde detecting unit includes a formaldehyde detecting layer, a diffusion restricting member and a concentration indicator. The formaldehyde detecting layer has the second surface and a formaldehyde detecting surface opposite to the second surface. The formaldehyde detecting layer includes a formaldehyde detecting material that is applied on the formaldehyde detecting surface and that develops color when reacting with formaldehyde. The diffusion restricting member covers a portion of the formaldehyde detecting surface. The diffusion restricting member is configured to permit a restricted amount of formaldehyde to pass therethrough to react with the formaldehyde detecting material on the portion of the formaldehyde detecting surface, in such a manner that concentration of formaldehyde is determined based on a color change on the portion of the formaldehyde detecting surface. The concentration indicator is disposed on one of the formaldehyde detecting surface and the diffusion restricting member, and is configured to indicate the concentration of formaldehyde detected. The formaldehyde barrier unit covers the lateral surface of the formaldehyde detecting unit to avoid formaldehyde entering the formaldehyde detecting unit through the lateral surface.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
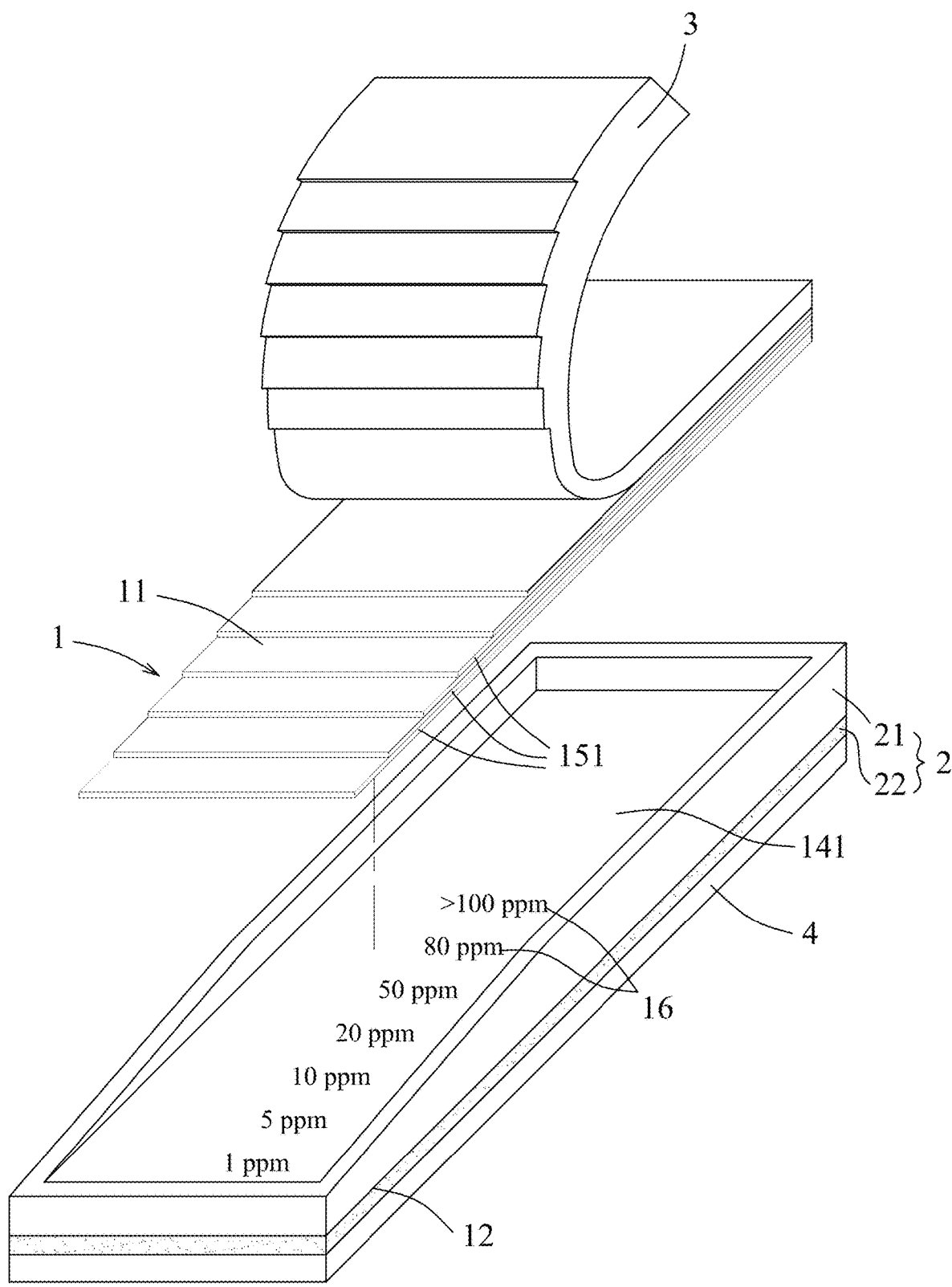
FIG. 1 is an exploded perspective view illustrating an embodiment of a formaldehyde detecting device according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
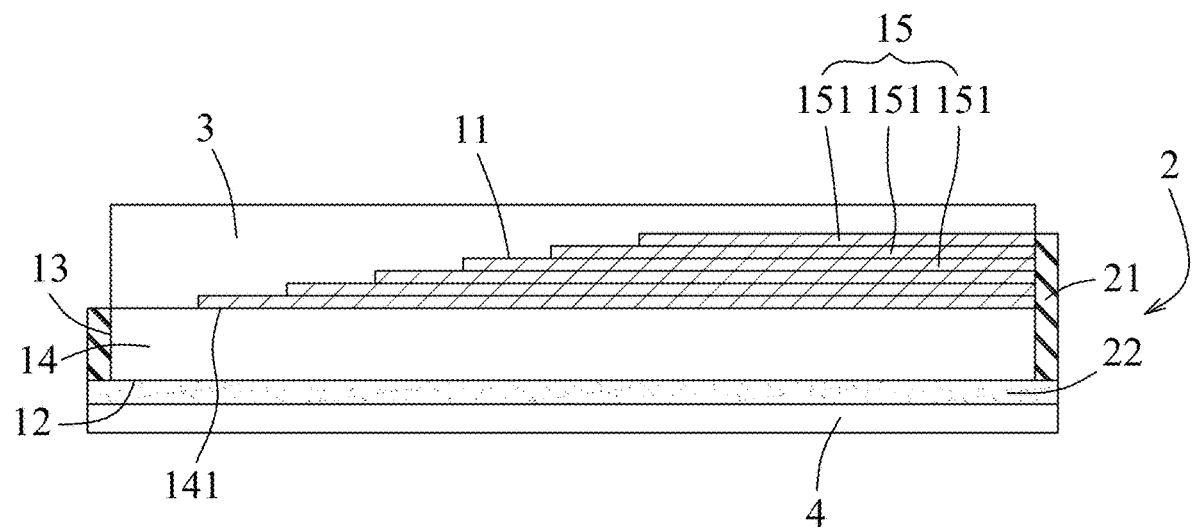
FIG. 2 is a side cross-sectional view illustrating the embodiment.
Figure 3:
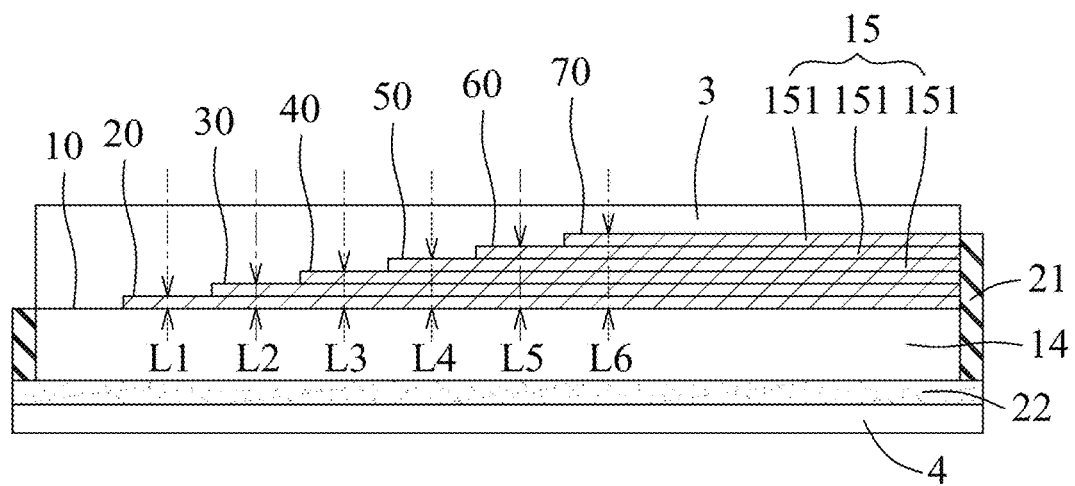
FIG. 3 is a view similar to FIG. 2, illustrating minimal diffusion distances of formaldehyde when passing through a diffusion restricting member and reaching a formaldehyde detecting surface.

Referring to FIGS. 1 to 3, an embodiment of a formaldehyde detecting device according to the disclosure includes a formaldehyde detecting unit 1, a formaldehyde barrier unit 2, a first release layer 3 and a second release layer 4.

The formaldehyde detecting unit 1 has a first surface 11 through which formaldehyde enters, a second surface 12 opposite to the first surface 11, and a lateral surface 13 interconnecting the first surface 11 and the second surface 12. The formaldehyde detecting unit 1 includes a formaldehyde detecting layer 14, a diffusion restricting member 15 and a concentration indicator 16.

The formaldehyde detecting layer 14 has the second surface 12 and a formaldehyde detecting surface 141 opposite to the second surface 12. The formaldehyde detecting layer 14 includes a carrier sheet and a formaldehyde detecting material that is applied on the carrier sheet. The formaldehyde detecting material may be applied on the carrier sheet by any printing techniques well-known in this art, such as an inkjet method or a coating method. Examples of the carrier sheet may include, but are not limited to, an ash-free cellulose paper, a glass fiber paper, a polytetrafluoroethylene fiber paper, and a nylon 66 fiber paper. In this embodiment, the carrier sheet is an ash-free cellulose paper.

The formaldehyde detecting material is capable of developing color when reacting with formaldehyde. Examples of the formaldehyde detecting material may include, but are not limited to, a reagent used in an acetylacetone method, a reagent used in a phenol reagent method, a reagent used in the chromotropic acid method, a reagent used in 4-amino-3-hydrazino-5-mercapto-1,2,4-triazole (AHMT) method, and a reagent used in Benedict's test. In this embodiment, the formaldehyde detecting material includes sulfuric acid and 1,8-dihydroxynaphthalene-3,6-disulfonic acid which are used in the chromotropic acid method. Such formaldehyde detecting material is initially colorless, and turns purple when reacting with formaldehyde.

The diffusion restricting member 15 covers a portion of the formaldehyde detecting surface 141. The uncovered portion of the formaldehyde detecting surface 141 and a surface of the diffusion restricting member 15 opposite to the formaldehyde detecting layer 14 cooperate to form the first surface 11 of the formaldehyde detecting unit 1. The diffusion restricting member 15 is configured to permit a restricted amount of formaldehyde to pass therethrough to react with the formaldehyde detecting material on the portion of the formaldehyde detecting surface 141 covered by the diffusion restricting member 15 in such a manner that concentration of formaldehyde is determined based on a color change on the portion of the formaldehyde detecting surface 141.

For example, the diffusion restricting member 15 may include a plurality of diffusion restricting layers 151 that are stacked on each other and that have an area gradually decreasing along a direction away from the formaldehyde detecting surface 141. The diffusion restricting layers 151 may be prepared by 3D printing, electrospinning, sol-gel method or spray coating. The number of the diffusion restricting layers 151 may be adjusted according to practical needs. In this embodiment, the diffusion restricting member 15 includes six diffusion restricting layers 151 that are stacked on the formaldehyde detecting layer 14 along a stacking direction away from the formaldehyde detecting layer 14, and that have gradually decreasing areas to cooperatively form a step structure. Referring further to FIG. 3, the formaldehyde detecting layer 14 has an exposed region 10 that is not covered by the diffusion restricting member 15, and each of the diffusion restricting layers 151 has a respective one of exposed regions 20, 30, 40, 50, 60 and 70 along the stacking direction. The exposed regions 10 to 70 cooperate to form the first surface 11 of the formaldehyde detecting unit 1 which has a step structure.

Each of the diffusion restricting layers 151 may be made of a material selected from the group consisting of polysiloxane, polyvinyl chloride, acrylic resin, polyurethane, and combinations thereof. In this embodiment, each of the diffusion restricting layers 151 has a plurality of pores (not shown). The pores may have an average diameter ranging from 0.01 µm to 10 µm. Each of the diffusion restricting layers 151 may have a porosity ranging from 60% to 80%. Each of the diffusion restricting layers 151 may have a thickness ranging from 1 µm to 100 µm. In this embodiment, each of the diffusion restricting layers 151 has a thickness of 10 µm, a porosity of 60%, and the pores have an average diameter of 0.1 µm.

Figure 4:
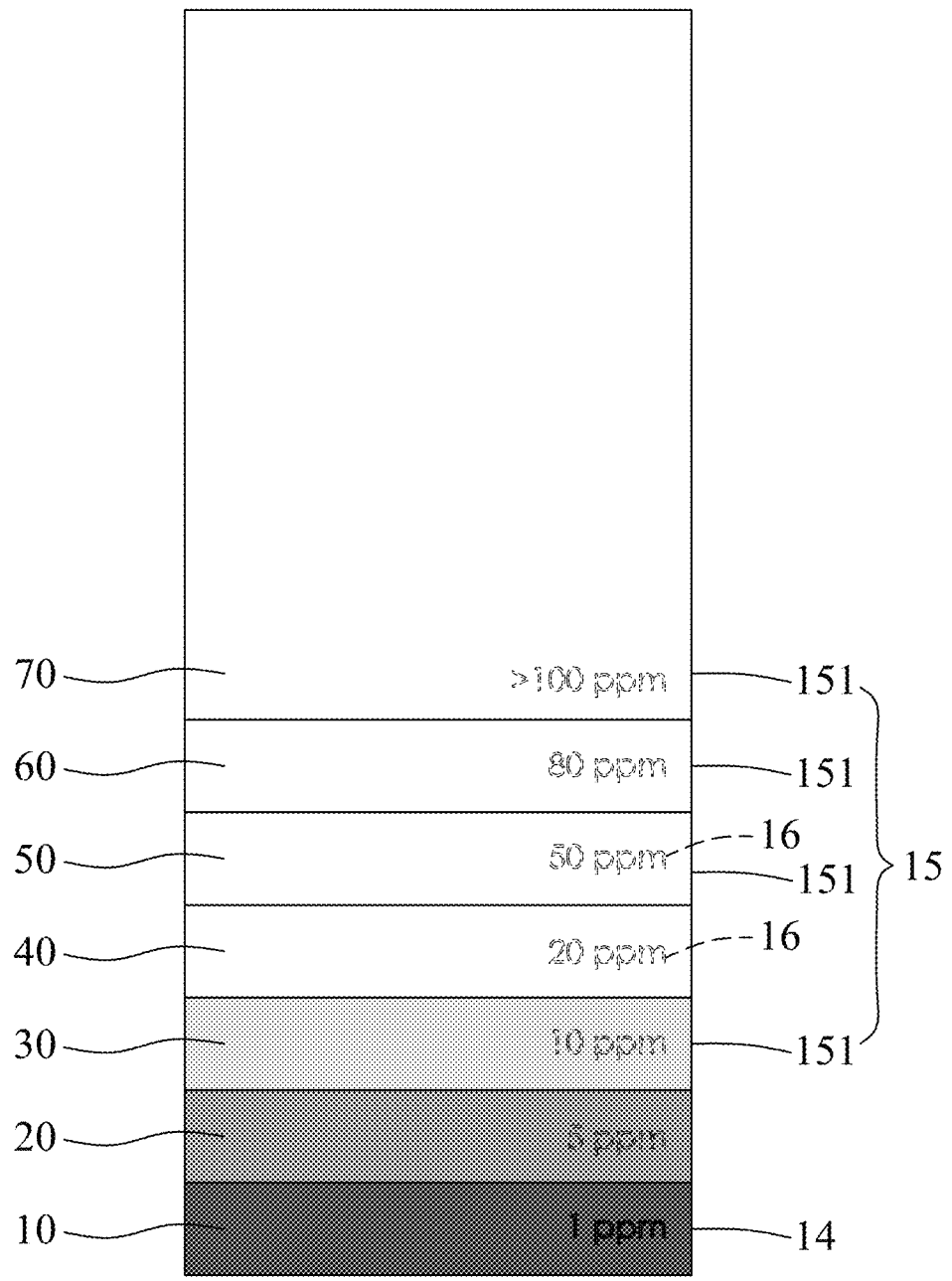
FIG. 4 is a top view illustrating a color change of the formaldehyde detecting surface of the embodiment for detecting concentration of formaldehyde.

The concentration indicator 16 may be disposed on the formaldehyde detecting surface 141 and/or the diffusion restricting member 15, and is configured to indicate the concentration of formaldehyde detected. In certain embodiments, the concentration indicator 16 includes a plurality of numerical scales representing different concentrations. The number of the numerical scales may correspond to a total number of the formaldehyde detecting layer 14 and the diffusion restricting layers 151. Referring to FIG. 4, in this embodiment, the concentration indicator 16 includes seven numerical scales (i.e., 1 ppm, 5 ppm, 10 ppm, 20 ppm, 50 ppm, 80 ppm, and >100 ppm) that are disposed on the formaldehyde detecting surface 141 and that correspond in position to the exposed region 10 of the formaldehyde detecting layer 14 and the exposed regions 20, 30, 40, 50, 60, 70 of the diffusion restricting layers 151, respectively. In other embodiments, the numerical scales may also be disposed on the diffusion restricting member 15, as long as the numerical scales can be visually observed by a user.

Referring again to FIGS. 1 and 3, the diffusion restricting layers 151 are sequentially stacked on the formaldehyde detecting surface 141, and have gradually increasing distances (L1, L2, L3, L4, L5 and L6) from the formaldehyde detecting surface 141. That is, formaldehyde entering the formaldehyde detecting unit 1 via the exposed regions 20 to 70 of the diffusion restricting member 15 needs to pass through the diffusion restricting layers 151 with gradually increasing distances in order to reach the formaldehyde detecting layer 14 and then detected under the exposed regions 20 to 70. Since each of the diffusion restricting layers 151 would restrict a predetermined amount of formaldehyde passing through, the amount of formaldehyde that can reach the formaldehyde detecting layer 14 to induce color development would be gradually reduced with the increasing number of diffusion restricting layers 151. Therefore, the formaldehyde detecting layer 14 exhibits a gradual change in shade of color (e.g., darker shade of color to lighter shade of color as shown in FIG. 4) along an extending direction from the exposed region 10 towards the portion of the formaldehyde detecting surface 141 covered by the diffusion restricting member 15. In other words, in use, the exposed region 10 of the formaldehyde detecting layer 14 would exhibit a darkest shade of color, while the portion of the formaldehyde detecting surface 141 covered by the diffusion restricting member 15 would exhibit a gradually lighter color shade as the amount of formaldehyde that can reach the formaldehyde detecting surface 141 gradually decreases.

As exemplified in FIG. 4, the color only develops in the exposed region 10 of the formaldehyde detecting layer 14 and the portions of the formaldehyde detecting layer 14 corresponding in position to the exposed regions 20 and 30, indicating the concentration of formaldehyde detected is lower than 20 ppm (i.e., such concentration of formaldehyde can pass through only two of the diffusion restricting layers 151 to reach the formaldehyde detecting layer 14). Thus, each of the diffusion restricting layers 151 may correspond to a respective one of concentrations of formaldehyde which may be indicated by the numerical scales of the concentration indicator 16.

In order to avoid formaldehyde entering the formaldehyde detecting unit 1 through a region other than the first surface 11 (e.g., through the lateral surface 13) to induce uneven color change (i.e., reduce the possibility of detection error), the formaldehyde barrier unit 2 is disposed to cover the lateral surface 13 of the formaldehyde detecting unit 1.

In this embodiment, the formaldehyde barrier unit 2 includes a first formaldehyde barrier layer 21 that covers the lateral surface 13 of the formaldehyde detecting unit 1, and a second formaldehyde barrier layer 22 that covers the second surface 12 of the formaldehyde detecting unit 1, so as to further avoid formaldehyde entering the formaldehyde detecting unit 1 through the second surface 12. Each of the first formaldehyde barrier layer 21 and the second formaldehyde barrier layer 22 may be independently made of a material selected from the group consisting of polyethylene, poly(vinylidene chloride), poly(4-methyl-1-pentene), and combinations thereof. In this embodiment, the first formaldehyde barrier layer 21 is made of polyethylene, and the second formaldehyde barrier layer 22 is made of polyethylene. In a case that the formaldehyde detecting device of the disclosure is to be fixed to an object (e.g., a wall, a furniture, etc.) through the second surface 12 facing the object, the second formaldehyde barrier layer 22 may include an adhesive material to serve as an adhesive layer.

The first release layer 3 may be releasably adhered on the first surface 11 of the formaldehyde detecting unit 1. The first release layer 3 is configured to prevent formaldehyde from entering into the formaldehyde detecting device through the first surface 11 and then reaching and reacting with the formaldehyde detecting material, so as to avoid color change before the formaldehyde detecting device is in use.

The second release layer 4 may be releasably adhered on the second formaldehyde barrier layer 22 opposite to the second surface 12 of the formaldehyde detecting unit 1. The second release layer 4 may protect the second formaldehyde barrier layer 22 from being stuck with a foreign substance (such as dust) before the formaldehyde detecting device is in use.

When the embodiment of the formaldehyde detecting device is in use, the second release layer 4 is removed and the formaldehyde detecting device may be placed onto a wall, a glass surface or a furniture (not shown in figures) through the second formaldehyde barrier layer 22. The first release layer 3 is then removed so as to expose the first surface 11 of the formaldehyde detecting unit 1. When in use, formaldehyde in the environment enters into the formaldehyde detecting unit 1 through the first surface 11, and diffuses from the exposed regions 20 to 70 of the diffusion restricting layers 151 toward the formaldehyde detecting layer 14. When formaldehyde to be detected is only capable of passing through the diffusion distance L1 and L2 to react with the formaldehyde detecting material and then develop color, it can be observed on the formaldehyde detecting surface 141 that the developed color gradually changes from the exposed region 10 (the darkest shade of color) to the covered portion corresponding to the exposed region 30 (the lightest shade of color), and that no color change can be seen on the remainder of the covered portion corresponding to the exposed regions 40, 50, 60, 70. By visually observing the concentration indicator 16 that is located on the formaldehyde detecting surface 141 with color change, the concentration of the formaldehyde detected can thus be determined simply through the numerical scales of the concentration indicator 16.

In sum, by virtue of including the diffusion restricting member 15 which is configured to restrict a predetermined amount of formaldehyde to pass therethrough and reach the formaldehyde detecting layer 14 to be detected, and including the concentration indicator 16 which is disposed to indicate concentration of formaldehyde determined based on a color change on the formaldehyde detecting layer 14, the formaldehyde detecting device of the present disclosure can be used to directly determine the concentration of formaldehyde in an efficient manner without using a colorimetric chart.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A formaldehyde detecting device, comprising:
   a formaldehyde detecting unit that has a first surface through which formaldehyde enters, a second surface opposite to said first surface, and a lateral surface interconnecting said first surface and said second surface, said formaldehyde detecting unit including
      a formaldehyde detecting layer having said second surface and a formaldehyde detecting surface opposite to said second surface, said formaldehyde detecting layer including a formaldehyde detecting material that is applied on said formaldehyde detecting surface and that develops color when reacting with formaldehyde;
      a diffusion restricting member that covers a portion of said formaldehyde detecting surface, and that is configured to permit a restricted amount of formaldehyde to pass therethrough to react with said formaldehyde detecting material on said portion of said formaldehyde detecting surface, in such a manner that concentration of formaldehyde is determined based on a color change on said portion of said formaldehyde detecting surface; and
      a concentration indicator that is disposed on at least one of said formaldehyde detecting surface and said diffusion restricting member, and that is configured to indicate the concentration of formaldehyde detected; and
   a formaldehyde barrier unit covering said lateral surface and said second surface of said formaldehyde detecting unit to avoid formaldehyde entering said formaldehyde detecting unit through said lateral surface and said second surface.

2. The formaldehyde detecting device of claim 1, wherein said diffusion restricting member includes a plurality of diffusion restricting layers that are stacked on each other and that have an area gradually decreasing along a direction away from said formaldehyde detecting surface.

3. The formaldehyde detecting device of claim 2, wherein said concentration indicator includes a plurality of numerical scales that are located at positions corresponding to said diffusion restricting layers.

4. The formaldehyde detecting device of claim 1, further comprising a first release layer that is releasably adhered on said first surface of said formaldehyde detecting unit.

5. The formaldehyde detecting device of claim 1, wherein said formaldehyde barrier unit includes a first formaldehyde barrier layer that covers said lateral surface of said formaldehyde detecting unit, and a second formaldehyde barrier layer that covers said second surface of said formaldehyde detecting unit.

6. The formaldehyde detecting device of claim 5, further comprising a second release layer that is releasably adhered on said second formaldehyde barrier layer opposite to said formaldehyde detecting unit.

7. The formaldehyde detecting device of claim 5, wherein each of said first formaldehyde barrier layer and said second formaldehyde barrier layer is independently made of a material selected from the group consisting of polyethylene, poly(vinylidene chloride), poly(4-methyl-1-pentene), and combinations thereof.

8. The formaldehyde detecting device of claim 2, wherein each of said diffusion restricting layers is made of a material selected from the group consisting of polysiloxane, polyvinyl chloride, acrylic resin, polyurethane, and combinations thereof.

9. The formaldehyde detecting device of claim 2, wherein each of said diffusion restricting layers has a plurality of pores, said pores having an average diameter ranging from 0.01 µm to 10 µm.

10. The formaldehyde detecting device of claim 9, wherein each of said diffusion restricting layers has a porosity ranging from 60% to 80%.

11. The formaldehyde detecting device of claim 2, wherein each of said diffusion restricting layers has a thickness ranging from 1 µm to 100 µm.

\* \* \* \* \*